United States Patent Office 3,497,483
Patented Feb. 24, 1970

3,497,483
1-CYCLOPROPYL-1-PHENYL SUBSTITUTED ETHYLENE POLYMERS
Arthur D. Ketley, Silver Spring, Md., assignor to W. R. Grace & Co., New York, N.Y., a corporation of Connecticut
No Drawing. Continuation-in-part of application Ser. No. 607,392, Jan. 5, 1967, which is a continuation-in-part of application Ser. No. 369,323, May 21, 1964. This application Mar. 27, 1968, Ser. No. 716,322
Int. Cl. C08f 7/02
U.S. Cl. 260—79.5      11 Claims

ABSTRACT OF THE DISCLOSURE 1-cyclopropyl-1-R substituted ethylene, where R is a phenyl or substituted phenyl radical, is polymerized with a Friedel-Crafts catalyst to form a solid thermoplastic polymer which contains olefinic unsaturation and cyclobutyl groups in the main chain but a relatively small amount or no pendant cyclopropyl groups. The properties of this polymer can be modified by crosslinking it by conventional methods.

---

This application is a continuation-in-part of application Ser. No. 607,392, filed Jan. 5, 1967, now abandoned, which in turn is a continuation-in-part of application Ser. No. 369,323, filed May 21, 1964 now abandoned.

When a vinylcyclopropane

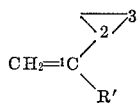

is polymerized with a Friedel-Crafts catalyst, the propagating chain end would be expected to be a non-classical bicyclobutonium ion

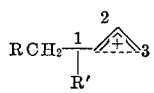

(See e.g. R. Breslow, p. 259–273 in Molecular Rearrangements, ed., P. de Mayo, Interscience, New York, 1963.)

This ion is capable of reacting at any of the carbon atoms 1, 2 or 3. However, it has been shown that when 1 is a secondary or tertiary carbon atom, as it is in this case, reaction takes place exclusively at carbon 1. (See Pearson & Langer, J. Am. Chem. Soc., 75, 1965 (1963); Sneen and Baron, J. Am. Chem. Soc., 83, 614 (1961); Hart and Sandri, J. Am. Chem. Soc., 81, 320 (1959).)

Hence, one would expect the polymers from substituted vinylcyclopropanes to have exclusively the structure

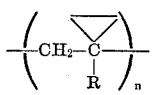

In the aliphatic cases the polymers are made up predominantly of this structure but this is not the case where R is an aromatic group.

Briefly stated, the process of the present invention comprises forming a solution of 1-cyclopropyl-1-R substituted ethylene where R is selected from the group consisting of phenyl and substituted phenyl radicals with a solvent which is liquid under polymerization conditions, and polymerizing the monomer in the presence of a Friedel-Crafts catalyst at a temperature of 0 to —130° C. to form a solid thermoplastic polymer consisting essentially of recurring structural units of the formula

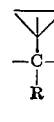 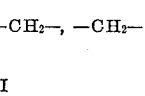 and 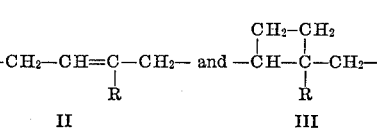

I            II            III wherein all the formulae herein R is a member of the group consisting of phenyl and substituted phenyl, the mole percent of III is at least 30% and the combined mole percent of II and III is 80–100%.

The 1-cyclopropyl-1-R substituted ethylene monomer of the present invention has the formula:

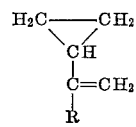

where R is a phenyl or substituted phenyl radical.

Representative of the monomers operable in the instant invention is 1-cyclopropyl-1-phenyl ethylene; 1-cyclopropyl - 1 - (para - fluorophenyl) - ethylene; 1-cyclopropyl - 1 - (para - tolyl) - ethylene; 1 - cyclopropyl-1 - (4 - methoxy - phenyl) - ethylene; 1- cyclopropyl - 1- (para-isopropyl phenyl) ethylene; and 1-cyclopropyl-1-(2,4-dimethylphenyl) ethylene.

In the instant invention the 1-cyclopropyl-1-R substituted ethylene was prepared according to the Wittig reaction by first reacting triphenyl phosphine with methyl bromide to form methyltriphenylphosphonium bromide (I′) which is a stable salt. The bromide (I′) was then reacted with butyllithium (II′) to form methylene-triphenylphosphorane (III′). The phosphorane is an unstable, very reactive, yellow solution which should be formed immediately prior to its reaction with the aldehyde or ketone. This phosphorane (III′) was then reacted with 1-cyclopropyl-1-R substituted ketone (IV′) to form the complex (V′). Water was then admixed with the complex to decompose it to form the 1-cyclopropyl-1-R substituted ethylene (VI′) and triphenyl phosphine oxide (VII′).

This is illustrated in equation form as follows:

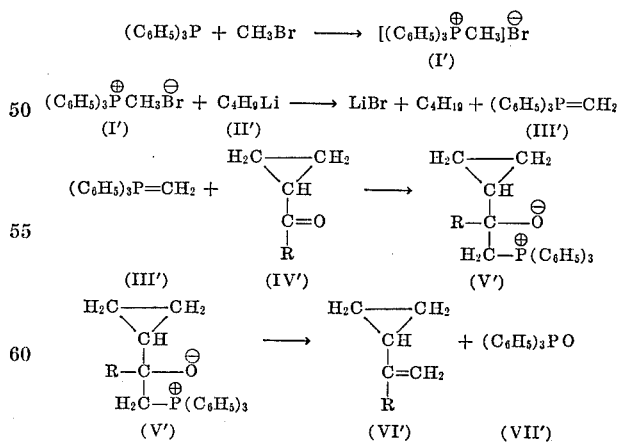

The 1-cyclopropyl-1-R substituted ethylene should be prepared under anhydrous conditions in the absence of air to avoid side reactions. Satisfactory conditions are obtained by carrying out the reaction under a cover of a dry inert gas such as nitrogen and using a reaction medium such as dry ethyl ether.

In carrying out the instant process, the monomer is dissolved in a solvent. The solvent is necessary to maintain effectively the desired low polymerization temperatures and to prevent the monomer from freezing. The solvent must be liquid at the low temperature of the polymerization reaction. It must also be substantially anhydrous to prevent side reactions.

The solvent may be an inert liquid hydrocarbon such as liquid propane, liquid butane and liquid pentane. It may also be an alkyl halide such as methyl chloride, butyl chloride and ethyl chloride. Generally, the monomer is used in an amount of 1 to 100 percent by weight of the solvent.

The polymerization catalyst of the instant invention is a metal halide known generally as a Friedel-Crafts catalyst. Typical examples of such a catalyst are aluminum chloride, aluminum bromide, aluminum iodide, stannic chloride, boron trifluoride, boron trifluoride diethyl ether complex, boron trifluoride dimethyl ether complex, boron trifluoride methyl ethyl ether complex, boron trifluoride diisopropyl ether complex, boron trifluoride methyl phenyl ether complex, boron trifluoride tetrahydrofuran complex, boron trifluoride dioxan complex, boron trifluoride di-dioxan complex and boron trifluoride methyl amyl ether complex.

The amount of Friedel-Crafts catalyst used in the instant process is based upon the amount of monomer in solution and may range from about 0.01 to 10 percent by weight of the monomer. Generally, an amount of Friedel-Crafts catalysts in the range of 0.1 to 1.0 percent by weight is satisfactory and preferred.

The process of the instant invention should be carried out under substantially anhydrous conditions to avoid side reactions. Any conventional method may be used to provide the desired anhydrous conditions. Usually, carrying out the process at substantially atmospheric pressure under a blanket of a substantially dry inert gas such as nitrogen or argon provides satisfactory conditions.

The temperature of the polymerization reaction may range from 0 to $-130°$ C. Generally, temperatures lower than $-130°$ C. will freeze the monomer solvent solution. On the other hand, temperatures higher than $0°$ C. will produce low molecular weight polymers and undesirable side products. A temperature of about $-78°$ C. is satisfactory.

The polymer of the instant invention contains olefinic unsaturation and cyclobutyl groups but contains a relatively small amount or no pendant cyclopropyl groups. Frequently, it is unsaturated, and the degree of unsaturation depends on the particular substituted phenyl radical of the monomer. The presence of phenyl or substituted phenyl groups in the polymer imparts to it properties similar to that of polystyrene, i.e. it is generally a stiff and relatively hard material.

The polymers and copolymers of the instant invention can be crosslinked with various crosslinking agents. Operable crosslinking agents include, but are not limited to, sulfur, di and polymercaptans and the Friedel-Crafts catalysts mentioned supra as polymerization catalysts. The crosslinking reaction can be performed in the melt of the polymeric material or in a solution of the uncrosslinked polymeric material at a temperature in the range $-30$ to $120°$ C. Solvents for the uncrosslinked polymer material are preferably chlorinated hydrocarbons, e.g., methylene chloride, chloroform and the like. The amount of crosslinking agent employed is 0.1 to 5% by weight of polymeric material, preferably 0.5-1% on the same basis.

Crosslinking the polymer raises its melting point and lowers its solubility. Where the polymer contains a substituted phenyl radical, while capable of crosslinking, it is usually not capable of being crosslinked to a point where it is infusible, and therefore, it is heat compression moldable by methods conventionally used to mold thermoplastic polymers. Where the polymer contains the unsubstituted phenyl radical, a fusible moldable polymer can be produced by shortening crosslinking time by destroying the crosslinking agent with conventional methods. For example, methanol destroys the crosslinking action of an agent such as aluminum bromide.

In an embodiment of the present invention, the 1-cyclopropyl-1-R substituted ethylene monomer can be copolymerized with other olefins. Typical examples of olefins which will copolymerize with the 1-cyclopropyl-1-R substituted ethylene are styrene, alpha-methyl styrene, isobutene and $\beta$-methyl styrene, and vinyl ethers such as methyl vinyl ether, isopropyl vinyl ether, benzyl vinyl ether, octyl vinyl ether and the like.

The specific olefin used, and the amount in which it is used, to form the copolymer will depend largely upon the particular polymer properties desired. The composition of the 1-cyclopropyl-1-R substituted ethylene-olefin copolymer may be comprised, therefore, of 0.1 to 99.9 percent by weight of the 1-cyclopropyl-1-R subsituted ethylene and from 99.9 to 0.1 percent by weight of the olefin.

The time required to carry out the polymerization reaction will depend upon the specific reaction conditions and the particular monomer being polymerized.

The polymers and copolymers of this invention can be used in a number of applications. For example, they can be molded by conventional techniques to form structures such as film and tubing. The crosslinked polymers are especially useful where higher melting points and lower solubilities are desired.

All parts and percentages used herein are by weight unless otherwise indicated.

Unless otherwise stated, tests in the following examples were made as follows:

NMR spectra to determine polymer structure were obtained by dissolving 15 parts by weight polymer in 100 parts perchlorobutadiene and making measurements at 190° C. using a Varian A–60A Nuclear Magnetic Resonance Spectrometer. Tetramethylsilane was used as the internal reference.

Integral data for the n.m.r. signals arising from aromatic, vinyl, saturated (including allylic and cyclobutyl) and cyclopropyl protons were measured on the polymers. On the basis of this data the contributions of the structures:

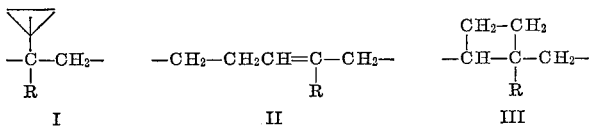

were calculated. Qualitative confirmations of the structures were obtained by the presence or absence of infrared absorptions at 1015 cm.$^{-1}$ and 1045 cm.$^{-1}$ (cyclopropyl) hereinafter fererred to as I; at 1620–1630 cm.$^{-1}$ (C=C stretching) hereinafter referred to as II and at 915 cm.$^{-1}$ and 1235 cm.$^{-1}$ (cyclobutyl) hereinafter referred to as III.

In the polymers from vinylcyclopropane and 1,1-dicyclopropyl ethylene, a major portion of the cyclopropyl groups remain intact as shown by the large absorptions at $>9\tau$ in the n.m.r. spectrum. In the aryl substituted compounds, the cyclopropyl groups are largely or wholly destroyed, the n.m.r. spectra showing little or no absorption at $>9\tau$.

Takahashi and Yamashita in Preprints, II, 5, I.U.P.A.C. International Symposium on Macromolecular Chemistry, Kyote and Tokyo, Sept. (1966) have also reported a n.m.r. study on the polymer of vinylcyclopropane prepared with SnCl$_4$ catalyst in the prior art. These workers report a structure ratio of 71% of I, .9% of II and 20% unidentified structure, probably III. These results are in quite good agreement with those obtained by us. Isopropenylcyclopropane, with the same catalyst, gave a polymer with 100% 1,2-structure.

Melting points were measured on a Fisher melting point apparatus.

The number average molecular weight of the polymer is described in "Principles of Polymer Chemistry" by Flory (Cornell University Press). This was measured on a Mechrolab vapor pressure Osmometer.

Radioactivity counts were made on a Cary vibrating reed electrometer, Model 6000.

Example 1

In this example, 1-cyclopropyl-1-phenyl ethylene was prepared from 1-cyclopropyl-1-phenyl ketone according to the Wittig reaction.

A 2 liter resin kettle equipped with stirrer, thermometer and dropping funnel was used. The kettle was immersed in an ice-salt bath. A dry nitrogen flow into the kettle was maintained throughout the reaction to provide anhydrous conditions.

87.2 grams (.244 mole) of methyl triphenyl phosphonium bromide and 600 cc. dry ethyl ether were added to the kettle with mixing to form a suspension which was cooled to −30° C.

A solution of butyl lithium in n-hexane having a concentration of .235 mole of butyl lithium per 100 grams of solution was then added to the kettle with mixing by means of a syringe. 103.3 grams or 156 cc. of the solution (.243 mole of butyl lithium) was added at a rate which did not raise the temperature of the mixture in the kettle above +3° C. In forming the monomer, a rise in temperature above +3° C. results in products which are difficult, if not impossible, to characterize as is known in the art. When the addition of the butyl lithium solution was completed, and the mixture in the kettle cooled to −3° C., the bright yellow solution of methylene triphenyl phosphorane formed.

A solution comprised of 35.7 grams (.244 mole) of 1-cyclopropyl-1-phenyl ketone in 300 cc. dry ethyl ether was formed. The solution was cooled to −3° C. in an ice-salt bath and then added to the kettle through the dropping funnel at a rate which did not raise the temperature of the mixture in the kettle above +3° C.

The resulting product was viscous and white indicating that a complex of the 1-cyclopropyl-1-phenyl ketone and the methylene triphenyl phosphorane had formed. The temperature of the product was allowed to rise to about 20° C. About 500 cc. of water were then added to the product in the kettle with vigorous stirring to break the complex. Two liquid layers formed, a layer of ether solution and a layer of water solution. The ether solution was recovered and dried over magnesium sulfate for 30 minutes.

The dried ether solution was distilled on a thirty plate spinning band fractionating column. This fractionating column was comprised of a spiral wound stainless steel band encased in a glass column. The top of the steel band was connected to a motor which rotated the steel band during fractionation. The fractionation was carried out at 760 mm. Hg.

The first fraction was obtained at 35.5° C. and was comprised of ether. As the ether was distilled off, triphenyl phosphine oxide precipitated out. The second fraction was obtained at 68.5° C. and was comprised of hexane.

18.7 grams of 1-cyclopropyl-1-phenyl ethylene were obtained at 107° C. at 25 mm. Hg. This ethylene was a colorless oil with a refractive index of $n_D^{25}$ 1.5512 and a density of 0.936.

Example 2

In this example the 1-cyclopropyl-1-phenyl ethylene prepared in Example 1 was polymerized.

The polymerization apparatus was comprised of a 100 cc. micro reaction flask equipped with a stirrer. A flow of dry nitrogen gas was passed through the flask throughout the polymerization reaction to provide anhydrous conditions. The flask was immersed in a bath having a temperature of −75° C. and comprised of Dry Ice and acetone.

0.25 gram of aluminum bromide was mixed with 50 cc. of dry ethyl chloride and heated in a pressure tube to a temperature of 30° C. for about two minutes to dissolve the catalyst. The catalyst solution was then added to the reaction flask and cooled to a temperature of −75° C. 3.8 grams of the 1-cyclopropyl-1-phenyl ethylene were then syringed into the reaction flask.

The polymerization reaction was allowed to continue with stirring at −75° C. for 5 mins. At the end of this time, 2 cc. of methyl alcohol were added to the reaction flask to deactivate the polymerization catalyst and precipitate the polymer.

The reaction mixture was poured into an excess amount of methyl alcohol and the precipitated polymer was recovered. The polymer was mixed with water in a Waring Blendor to clean it. The polymer was then recovered and dried in a vacuum oven at room temperature for 48 hours.

The dried polymer weighed 3.7 grams. It is was a very fine, white powder which melted at 78–82° C. The polymer was soluble in carbon tetrachloride.

Characterization of the polymeric product by n.m.r. showed that is contained 15 mole percent of I, 50 mole percent of II and 35 mole percent of III.

Example 3

In this example, 1-cyclopropyl-1-phenyl ethylene monomer which was prepared substantially as described in Example 1 was polymerized.

The apparatus used in this example was the same as that described in Example 2. The reaction flask was immersed in a bath of Dry Ice and acetone having a temperature of −78° C.

3.8 grams (4 cc.) of 1-cyclopropyl-1-phenyl ethylene monomer were dissolved in 50 cc. of dry ethyl chloride and the resulting solution was added to the cooled reaction flask.

0.1 gram of aluminum bromide was mixed with 40 cc. of dry ethyl chloride and heated in a pressure tube to a temperature of 30° C. to dissolve the catalyst. The catalyst solution was then immersed in a bath of Dry Ice and acetone and cooled to −78° C. The cooled catalyst solution was added slowly with mixing to the cooled monomer solution in the reaction flask.

The polymerization reaction was allowed to continue with stirring at −78° C. for 5 minutes. At the end of this time, 5 cc. of methyl alcohol were added to the reaction flask to deactivate the polymerization catalyst and precipitate the polymer.

The polymer was recovered and mixed with water in a Waring Blendor to clean it. The polymer was then recovered and dried in a vacuum oven at room temperature for 48 hours.

The dried polymer weighed 3.7 grams. It has a melting point of 78–82° C.

Characterization of the polymeric product by n.m.r. showed that it contained 15 mole percent of I, 50 mole percent of II and 35 mole percent of III.

Example 4

In this example, 1-cyclopropyl-1-phenyl ethylene monomer, which was prepared substantially as described in Example 1, was polymerized.

The polymerization apparatus used in this example was the same as that described in Example 2.

The procedure used in this example was substantially the same as that described in Example 3. The monomer solution was comprised of 4 cc. of monomer and 40 cc. of dry ethyl chloride. The catalyst solution consisted of .13 cc. of boron trifluoride diethyl ether complex and 50 cc. of dry ethyl chloride.

The polymerization reaction was allowed to continue with vigorous stirring at −78° C. for 24 hours. At the end of this time, a solution comprised of about 50% methyl alcohol and 50% water was added to the reaction flask to deactivate the polymerization catalyst and precipitate the polymer.

The polymer was recovered, cleaned and dried substantially as described in Example 3. The dried polymer weighed 2 grams. It had a melting point of 78–82° C. and a number average molecular weight of 1580. The polymer was completely soluble in carbon tetrachloride.

Example 5

In this example, 1-cyclopropyl-1-(4-methoxy-phenyl)-ethylene was prepared from 1 - cyclopropyl - 1 - (4-methoxy-phenyl)-ketone according to the Wittig reaction.

The general procedure and apparatus used in this example was substantially the same as that in Example 1.

A 2 liter resin kettle equipped with stirrer, thermometer and dropping funnel was used. The kettle was immersed in an ice-salt bath. A dry nitrogen flow into the kettle was maintained throughout the reaction to provide anhydrous conditions.

94.6 grams (.265 mole) of methyl triphenyl phosphonium bromide and 600 cc. dry ethyl ether were added to the kettle with mixing to form a suspension which was cooled to −3° C.

A solution of butyl lithium in n-hexane having a concentration of .235 mole of butyl lithium per 100 grams of solution was then added to the kettle with mixing by means of a syringe. 113 grams of 170.3 cc. (.265 mole of butyl lithium) of the solution were added at a rate which did not raise the temperature of the mixture in the kettle above +3° C. When the addition of the butyl lithium solution was completed, and the mixture in the kettle cooled to −3° C. the bright yellow solution of methylene triphenyl phosphorane formed.

A solution comprised of 46.7 grams (.265 mole) of 1-cyclopropyl - 1 - (4 - methoxyphenyl)-ketone in 600 cc. of dry ethyl ether was formed. The solution was cooled to −3° C. in an ice-salt bath and then added to the kettle through the dropping funnel at a rate which did not raise the temperature of the mixture in the kettle above +3° C.

The resulting product was viscous and white indicating that a complex of the 1-cyclopropyl-1-(4-methoxy-phenyl)-ethylene and the methylene triphenyl phosphorane formed. The temperature of the product was allowed to rise to 20° C. About 500 cc. of water were then added to the kettle with vigorous stirring to break the complex. Two liquid layers formed, a layer of ether solution and a layer of water solution. The ether solution was recovered and distilled substantially as described in Example 1.

About 20.8 grams of the 1-cyclopropyl-1-(4-methoxyphenyl)-ethylene were produced at 116° C. at 5 mm. Hg. This ethylene was a clear viscous liquid with a refractive index of $n_D^{25}$ 1.5608.

Example 6

In this example the 1-cyclopropyl-1-(4-methoxy-phenyl)-ethylene monomer prepared in Example 5 was polymerized.

The apparatus used in this example was the same as that described in Example 2.

The procedure used in this example was substantially the same as that described in Example 3. The monomer solution consisted of 4 cc. of monomer and 40 cc. of dry ethyl chloride. The catalyst solution consisted of 0.25 gram (.001 mole) of aluminum bromide and 50 cc. of dry ethyl chloride.

A total amount of only 6.3 cc. of the catalyst solution, i.e. .00012 mole of aluminum bromide in 6.3 cc. of ethyl chloride, were added to the reaction flask.

The polymerization reaction was allowed to continue with stirring at −78° C. for 18 hours. At the end of this time the catalyst was deactivated and the polymer was recovered, washed and dried substantially as described in Example 3.

The dried polymer weighed 3.3 grams. It was a white fine powder which was soluble in carbon tetrachloride. About 90% of the polymer melted at a temperature of 93–103° C. and the remainder melted at a temperature in the range of 103–108° C.

Characterization of the polymeric product by n.m.r. showed that it contained 5 mole percent of I, 45 mole percent of II and 50 mole percent of III.

Example 7

1.0 gram of the polymer of 1-cyclopropyl-1-(4-methoxyphenyl)-ethylene prepared in Example 6 was placed in a platen press and pressed at 350° F. at a pressure of 10,000 p.s.i. for 2 minutes. The resulting film was clear but brittle.

Example 8

In this example, 1-cyclopropyl-1-(4-methoxy-phenyl)-ethylene monomer, which was prepared substantially as described in Example 5, was polymerized.

The apparatus used in this example was the same as that described in Example 2.

The procedure used in this example was substantially the same as that described in Example 3. The monomer solution consisted of 4 cc. monomer and 40 cc. of dry ethyl chloride. The catalyst solution consisted of 0.142 gram of 0.113 cc. (.001 mole) boron trifluoride diethyl ether complex and 50 cc. of dry ethyl chloride.

The polymerization reaction was allowed to continue with stirring at −78° C. for 16 hours. At the end of this time the catalyst was deactivated and the polymer was recovered, washed and dried substantially as described in Example 3.

3.4 grams of the dried polymer were obtained. The polymer was a granular white powder which was soluble in carbon tetrachloride. It had a softening point of 58–68° C. and a melting point of 68–76° C.

Characterization of the polymeric product by n.m.r. showed that it contained 5 mole percent of I, 45 mole percent of II and 50 mole percent of III.

Example 9

In this example, 1-cyclopropyl-1-(para-fluoro-phenyl)-ethylene was prepared from 1-cyclopropyl-1-(para-fluoro-phenyl)-ketone according to the Wittig reaction.

The general procedure and apparatus used in this example was the same as that in Example 1. 87 grams (.244 mole) of methyl triphenyl phosphonium bromide and 700 cc. dry ethyl ether were added to the kettle with mixing to form a suspension which was cooled to −3° C.

A solution of butyl lithium in n-hexane having a concentration of .235 mole of butyl lithium per 100 grams of solution was then added to the kettle with mixing by means of a syringe. 104 grams or 157 cc. of the solution (.244 mole of butyl lithium) was added at a rate which did not raise the temperature of the mixture in the kettle above +3° C. When the addition of the butyl lithium solution was completed, and the mixture in the kettle cooled to −3° C., the bright yellow solution of methylene triphenyl phosphorane formed.

A solution comprised of 40 grams (.244 mole) of 1-cyclopropyl-1-(para-fluoro-phenyl)-ketone in 700 cc. of dry ethyl ether was formed. The solution was cooled to −3° C. in an ice-salt bath and then added to the kettle through the dropping funnel at a rate which did not raise the temperature of the mixture in the kettle above +3° C.

The resulting product was viscous and white indicating that a complex of the 1-cyclopropyl-1-(para-fluoro-phenyl)-ethylene and the methylene triphenyl phosphorane had formed. The temperature of the product was allowed to rise to about 20° C. About 500 cc. of water were then added to the kettle with vigorous stirring to break the complex. Two liquid layers formed, a layer of ether solution and a layer of water solution. The ether solution was recovered and distilled substantially as described in Example 1.

22.9 grams of the 1-cyclopropyl-1-(para-fluoro-phenyl)-ethylene were obtained. This ethylene was a colorless oil with a boiling point of 72° C. at 4 mm. Hg and a refractive index of $n_D^{25}$ 1.5292.

Example 10

In this example, 1-cyclopropyl-1-(para-fluoro-phenyl)-ethylene prepared in Example 9 was polymerized.

The apparatus used in this example was the same as that described in Example 2.

The procedure in this example was substantially the same as that described in Example 3. The monomer solution consisted of 3 cc. of monomer and 40 cc. of dry ethyl chloride.

The catalyst solution was prepared by dissolving 0.25 gram of aluminum bromide in 50 cc. of dry ethyl chloride at a temperature of −78° C. The resulting catalyst solution was allowed to come to room temperature to dissolve the catalyst. The catalyst solution was then cooled to −78° C. and added slowly with mixing to the cooled monomer solution in the reaction flask.

The polymerization reaction was allowed to continue with stirring at −78° C. for 4 hours. At the end of this time, the catalyst was deactivated and the polymer was recovered, washed and dried substantially as described in Example 3.

2 grams of the dried polymer were obtained. The dried polymer was a white fine powder with a softening temperature in the range of 142 to 150° C. and a melting temperature in the range of 150–180° C. It had a number average molecular weight of 8710 and dissolved slowly in carbon tetrachloride. Characterization of the polymeric product by n.m.r. showed that it contained 20 mole percent of I, 50 mole percent of II, and 30 mole percent of III.

Example 11

1.0 gram of the polymer of 1-cyclopropyl-1-(para-fluoro-phenyl)-ethylene prepared in Example 10 was placed in a platen press and pressed at 350° F. at a pressure of 10,000 p.s.i. for 2 minutes. The resulting film was optically clear but brittle.

Example 12

In this example, 1-cyclopropyl-1-(para-fluoro-phenyl)-ethylene monomer, which was prepared substantially as described in Example 9 was polymerized.

The apparatus used in this example was substantially the same as that described in Example 2.

The procedure used in this example was substantially the same as that described in Example 3. The monomer solution consisted of 3 cc. of monomer and 40 cc. of dry ethyl chloride.

The polymerization catalyst was prepared by dissolving 0.2 cc. of the boron trifluoride diethyl ether complex in 50 cc. of dry ethyl chloride at a temperature of −78° C. The catalyst solution was then allowed to rise to room temperature to dissolve the catalyst. The catalyst solution was then cooled to −78° C. and added slowly with mixing to the cooled monomer solution in the reaction flask.

The polymerization reaction was allowed to continue with stirring at −78° C. for 4 hours. At the end of this time, the catalyst was deactivated and the polymer was recovered, washed and dried substantially as described in Example 3.

1.5 grams of the dried polymer were obtained. The dried polymer softened at a temperature of 90° C. and melted at a temperature in the range of 105 to 115° C. The polymer was soluble in carbon tetrachloride and had a number average molecular weight of 3850. Characterization of the polymeric product by n.m.r. showed that it contained 20 mole percent of I, 50 mole percent of II, and 30 mole percent of III.

Example 13

1.0 gram of the polymer of 1-cyclopropyl-1-(para-fluoro-phenyl)-ethylene prepared in Example 12 was placed in a platen press and pressed at a temperature of 350° F. at a pressure of 10,000 p.s.i. for 2 minutes. The resulting film was optically clear but brittle.

Example 14

In this example, 1-cyclopropyl-1-(para-tolyl)-ethylene was prepared from 1-cyclopropyl-1-(para-tolyl)-ketone according to the Wittig reaction.

The general procedure and apparatus used in this example was the same as that in Example 1. 98.7 grams (.276 mole) of methyl triphenyl phosphonium bromide and 800 cc. dry ethyl ether were added to the kettle with mixing to form a suspension which was cooled to −3° C.

A solution of butyl lithium in n-hexane having a concentration of .235 mole of butyl lithium per 100 grams of solution was then added to the kettle with mixing by means of a syringe. 177.5 grams of 178 cc. of the solution (.276 mole of butyl lithium) was added at a rate which did not raise the temperature of the mixture in the kettle above +3° C. When the addition of the butyl lithium solution was completed, and the mixture in the kettle cooled to −3° C., the bright yellow solution of methylene triphenyl phosphorane formed.

The 1-cyclopropyl - 1 - (para-tolyl)-ketone was used freshly distilled and had a boiling point of 110° C. at 4 mm. Hg. A solution comprised of 44.8 grams of (.28 mole) of the ketone in 600 cc. of dry ether was formed. The solution was cooled to −3° C. in an ice salt bath and then added to the kettle through the dropping funnel at a rate which did not raise the temperature of the mixture in the kettle above +3° C.

The resulting product was white and viscous indicating that a complex of the 1-cyclopropyl-1-(para-tolyl)-ketone and the methylene triphenyl phosphorane had formed. The temperature of the product was allowed to rise to 20° C. About 500 cc. of water were then added to the kettle with vigorous stirring to break the complex. Two liquid layers formed, a layer of ether solution and a layer of water solution. The ether solution was recovered and distilled substantially as described in Example 1. 25 grams of the 1-cyclopropyl-1-(para-tolyl)-ethylene were produced at 86° C. at 4 mm. Hg. This ethylene was colorless liquid with a refractive index of $n_D^{25}$ 1.5472.

Example 15

In this example, 1-cyclopropyl-1-(para-tolyl)-ethylene monomer prepared in Example 14 was polymerized.

The apparatus used in this example was the same as that described in Example 2.

The procedure used in this example was substantially the same as that described in Example 3. The monomer solution consisted of 3 cc. of monomer and 50 cc. of dry ethyl chloride. The catalyst solution consisted of 0.2 cc. of boron trifluoride diethyl ether complex and 40 cc. of dry ethyl chloride.

The polymerization reaction was allowed to continue with stirring at −78° C. for 4 hours. At the end of this time, the catalyst was deactivated and the polymer recovered, washed and dried as described in Example 3.

2.4 grams of the dried polymer were obtained. The dried polymer softened at a temperature of 95° C. and melted at a temperature in the range of 105 to 115° C. It had a number average molecular weight of 3200 to 3211. Characterization of the polymeric product by n.m.r. showed that it contained 5 mole percent of I, 45 mole percent of II, and 50 mole percent of III.

Example 16

In this example, 1-cyclopropyl-1-(para-tolyl)-ethylene monomer, which was prepared substantially as described in Example 14 was polymerized.

The apparatus used in this example was substantially the same as that described in Example 3. The monomer solution consisted of 3 cc. of monomer and 40 cc. of dry ethyl chloride. The catalyst consisted of 0.25 gram of aluminum bromide and 50 cc. of dry ethyl chloride.

The polymerization reaction was allowed to continue with stirring at −78° C. for 4 hours. At the end of this time, the catalyst was deactivated and the polymer recovered, washed and dried substantially as described in Example 3.

2.5 grams of the dried polymer were obtained. The polymer softened at a temperature of 180° C. and melted at a temperature in the range of 188 to 200° C. It had a number average molecular weight of 3990 to 4030. Characterization of the polymeric product by n.m.r. showed that it contained 5 mole percent of I, 45 mole percent of II, and 50 mole percent of III.

Example 17

In this example, 1 - cyclopropyl - 1 - (para-isopropyl phenyl) ethylene was prepared from 1-cyclopropyl-1-(para-isopropyl phenyl) ketone according to the Wittig reaction.

The general procedure and the apparatus used in this example was substantially the same as that described in Example 1. 86 grams (.240 mole) of methyl triphenyl phosphonium bromide and 800 cc. of dry ethyl ether were added to the kettle with mixing to form a suspension which was cooled to −3° C.

A solution of butyl lithium in n-hexane having a concentration of 0.234 mole of butyl lithium per 100 grams of solution was then added to the kettle with mixing by means of a syringe. 102 grams of the solution (0.240 mole of butyl lithium) were added at a rate which did not raise the temperature of the mixture in the kettle above +3° C. When the addition of the butyl lithium solution was completed, and the mixture in the kettle cooled to −3° C., a bright yellow solution of methylene triphenyl phosphorane formed.

A solution comprised of 39.8 grams (0.240 mole) of 1-cyclopropyl-1-(para-isopropyl phenyl) ketone in 600 cc. of dry ethyl ether was formed. The solution was cooled to −3° C. in an ice-salt bath and then added to the kettle through the dropping funnel at a rate which did not raise the temperature of the mixture in the kettle above +3° C.

The resulting product was white and viscous indicating that a complex of 1-cyclopropyl-1-(para-isopropyl phenyl) ketone and the methylene triphenyl phosphorane had formed. The temperature of the product was allowed to rise to 20° C. About 500 cc. of water were then added to the kettle with vigorous stirring to break the complex. Two liquid layers formed, a layer of ether solution and a layer of water solution. The ether solution was recovered dried and distilled substantially as described in Example 1, 24 grams of the 1-cyclopropyl-1-(para-isopropyl phenyl) ethylene were produced at 108° C. at 4 mm. Hg. This ethylene monomer had a refractive index of $n_D^{25}$ 1.5347.

Example 18

In this example, the 1-cyclopropyl-(para-isopropyl phenyl) ethylene monomer prepared in Example 17 was polymerized.

The apparatus used in this example was the same as that described in Example 2.

The procedure used in this example was substantially the same as that described in Example 3. The monomer solution consisted of 4 cc. of monomer and 40 cc. of dry ethyl chloride. The catalyst solution consisted of 0.25 gram of aluminum bromide and 50 cc. of dry ethyl chloride.

The polymerization reaction was allowed to continue for 4 hours at −78° C. At the end of this time, the catalyst was deactivated and the polymer recovered, washed and dried substantially as described in Example 3.

A 95 percent yield of polymer was obtained. The polymer was a fine white powder which softened at a temperature of 127° C. and melted at a temperature of 132 to 143° C. It had a molecular weight of 3040 to 3060. The polymer was soluble in carbon tetrachloride. Characterization of the polymeric product by n.m.r. showed that it contained 100 mole percent of III.

Example 19

1 gram of the polymer of 1-cyclopropyl-1-(para-isopropyl phenyl)-ethylene prepared in Example 18 was pressed in a platen press and pressed at 350° F. at a pressure of 10,000 p.s.i. for 2 minutes. The resulting film was brittle.

Example 20

In this example, 1 - cyclopropyl - 1 - (para-isopropyl phenyl) ethylene monomer which was prepared substantially as described in Example 17, was polymerized.

The apparatus used in this example was the same as that described in Example 2.

The procedure used in this example was substantially the same as that described in Example 3. The monomer solution consisted of 4 cc. of monomer and 40 cc. of dry ethyl chloride.

The polymerization reaction was allowed to continue with stirring at −78° C. for 4 hours. At the end of this time, the catalyst was deactivated and the polymer was recovered, washed and dried substantially as described in Example 3.

A 90 to 91% yield of the polymer was obtained. The polymer was a fine white powder which softened at a temperature of 88° C. and melted at a temperature in the range of 94 to 105° C. It had a number average molecular weight of 3190 to 3230 and was soluble in carbon tetrachloride and benzene. Characterization of the polymeric product by n.m.r. showed that it contained 100 mole percent of III.

Films were formed from the dried polymer as described in Example 19. The films were brittle.

Example 21

In this example, 1-cyclopropyl-1-(2,4-dimethyl phenyl) ethylene was prepared from 1-cyclopropyl-1-(2,4-dimethyl phenyl) ketone according to the Wittig reaction.

The general procedure and apparatus used in this example was the same as that in Example 1. 100 grams (0.28 mole) of methyl triphenyl phosphonium bromide and 800 cc. of dry ethyl ether were added to the kettle with mixing to form a suspension which was cooled to −3° C.

A solution of butyl lithium and n-hexane having a concentration of 0.28 mole of butyl lithium per 100 grams of solution was then added to the kettle by mixing by means of a syringe. 119 grams of 180 cc. of the solution was added at a rate which did not raise the temperature of the mixture in the kettle above 20° C. When the addition of the butyl lithium solution was completed, and the mixture in the kettle cooled to −3° C., the bright yellow solution of the methylene triphenyl phosphorane formed.

A solution comprised of 48 grams (0.28 mole) of the ketone and 600 cc. of dry ethyl ether was formed. The solution was cooled to −3° C. in an ice-salt bath and then added to the kettle through the dropping funnel at a rate which did not raise the temperature of the mixture in the kettle above +3° C.

The resulting product was white and viscous indicating that a complex of the ketone and methylene triphenyl phosphorane had formed. The temperature of the product was allowed to rise to 20° C. About 500 cc. of water were then added to the kettle with vigorous stirring to break the complex. The ether solution was recovered and distilled substantially as described in Example 1. 24.2 grams of the ethylene monomer were produced at 87.5° C. at 4 mm. Hg.

Example 22

In this example, the 1-cyclopropyl-1-(2,4-dimethyl phenyl) etheylene monomer prepared in Example 21, was polymerized.

The apparatus used in this example was the same as that used in Example 2.

The procedure used in this example was substantially the same as that described in Example 3. The monomer solution consisted of 4 cc. monomer and 50 cc. of dry ethyl chloride. The catalyst solution consisted of 0.25 gram of aluminum bromide and 40 cc. of dry ethyl chloride.

The polymerization reaction was allowed to continue for 17 hours with stirring at −78° C. At the end of this time, the catalyst was deactivated and the polymer recovered, washed, and dried substantially as described in Example 3.

The dried polymer softened at a temperature of 77° C. and melted at a temperature in the range of 97 to 105° C. It had a number average molecular weight of 10,900 to 11,000. The dried polymer was soluble in carbon tetrachloric and benzene. Characterization of the polymeric product by n.m.r. showed that it contained 70 mole percent of II and 30 mole percent of III.

Films were formed from the dry polymer as described in Example 19. The films were brittle.

Example 23

In this example, 1-cyclopropyl-1-(2,4-dimethyl phenyl) ethylene monomer which was prepared substantially as described in Example 21 was polymerized.

The apparatus used in this example was the same as that used in Example 2.

The procedure used in this example was substantially the same as that described in Example 3. The monomer solution consisted of 4 cc. of monomer and 40 cc. of dry ethyl chloride. The catalyst solution consisted of 0.13 cc. boron trifluoride diethyl ether complex and 50 cc. of dry ethyl chloride.

The polymerization reaction was allowed to continue for 4 hours at −78° C. At the end of this time, the catalyst was deactivated and the polymer was recovered, washed and dried substantially as described in Example 3.

The dried polymer softened at a temperature of 42° C. and melted at a temperature in the range of 52 to 57° C. It had a number average molecular weight of 2460 to 2490. The polymer was soluble in carbon tetrachloride and benzene. Characterization of the polymeric product by n.m.r. showed that is contained 70 mole percent of II and 30 mole percent of III.

Example 24

In this example, 1-cyclopropyl-1-phenyl ethylene was copolymerized with styrene.

Radioactive 1-cyclopropyl-1-phenyl ethylene was prepared generally as described in Example 1 except that carbon-14 labeled methyl bromide was used to prepare the methyl triphenyl phosphonium bromide. The methyl triphenyl phosphonium bromide and the 1-cyclopropyl-1-phenyl ethylene consequently also contained carbon-14 label. A portion of the 1-cyclopropyl-1-phenyl ethylene was polymerized to form the homopolymer substantially as described in Example 3. A radioactive count was taken of the 1-cyclopropyl-1-phenyl ethylene homopolymer and found to be 1.62 μc./gm.

The apparatus used in this example in the copolymerization of the radioactive 1-cyclopropyl-1-phenyl ethylene and styrene was the same as that used in Example 2.

The polymerization procedure used in this example was substantially the same as that described in Example 3. The monomer solution consisted of 2 grams of radioactive 1-cyclopropyl-1-phenyl ethylene, 2 grams of styrene and 40 cc. of dry ethyl chloride. The catalyst solution consisted of 0.25 gram of aluminum bromide and 50 cc. of dry ethyl chloride.

The polymerization reaction was allowed to continue with stirring at −78° C. for 4 hours. At the end of this time, the catalyst was deactivated and the copolymer was recovered, washed and dried substantially as described in Example 3.

The radioactive count was taken of the copolymer and found to be 0.83 μc./gm. This count was compared to that of the 1-cyclopropyl-1-phenyl ethylene homopolymer (1.62 μc./gm.) to determine the composition of the copolymer. Calculated on a percent by weight basis, the composition of the copolymer was determined to be 48% of polymerized styrene and 52% of polymerized 1-cyclopropyl-1-phenyl ethylene.

The copolymer softened at a temperature of 138° C. and melted at a temperature in the range of 155 of 168° C. It was soluble in carbon tetrachloride and benzene.

Characterization of the polymeric product by n.m.r. showed that it contained 15 mole percent of I, 50 mole percent of II and 35 mole percent of III.

Films were formed from the copolymer substantially as described in Example 19. The films were brittle.

Example 25

In this example, 1-cyclopropyl-1-phenyl ethylene was copolymerized with beta-methyl styrene.

Radioactive 1-cyclopropyl-1-phenyl ethylene was prepared as described in Example 24. A portion of the radioactive 1-cyclopropyl-1-phenyl ethylene was polymerized to form the homopolymer substantially as described in Example 3. A radioactive count was taken of the homopolymer and found to be 1.90 μc./gm.

The apparatus used in this example was the same as that described in Example 2.

The polymerization procedure used in this example was substantially the same as that described in Example 3. The monomer solution consisted of 4 grams of beta-methyl styrene, 4 grams of radioactive 1-cyclopropyl-1-phenyl ethylene and 50 cc. of dry ethyl chloride. The catalyst solution consisted of 0.25 gram of aluminum bromide and 50 cc. of dry ethyl chloride.

The polymerization reaction was allowed to continue with stirring at −78° C. for 18 hours. At the end of this time, the catalyst was deactivated and the copolymer was recovered, washed and dried substantially as described in Example 3.

The radioactive count was taken of the copolymer and found to be 0.94 μc./gm. This count was compared to that of the 1-cyclopropyl-1-phenyl ethylene homopolymer (1.90 μc./gm.) to determine the composition of the copolymer. Calculated on a percent by weight basis, the composition of the copolymer was determined to be 42% by weight of polymerized beta-methyl styrene and 58% by weight of polymerized 1-cyclopropyl-1-phenyl ethylene. The copolymer softened at a temperature of 167° and melted at a temperature in the range of 175 to 190° C. It was slightly soluble in carbon tetrachloride and benzene.

Example 26

Example 24 was repeated except that the styrene was replaced by isobutene.

Measured radioactivity of the copolymer showed that it contained 85% isobutene and 15% of units derived from 1-cyclopropyl-1-phenyl ethylene.

Example 27

Example 24 was repeated except that the styrene was replaced with isobutyl vinyl ether.

Measured radioactivity showed that 78% of the copolymer was isobutyl vinyl ether and 27% was units derived from 1-cyclopropyl-1-phenyl ethylene.

The following table illustrates the treatment of some of the instant polymers with crosslinking agents. The structures of the polymers before crosslinking were determined by nuclear magnetic resonance spectroscopy (n.m.r.) The table shows the rise in melting point produced when the polymer is crosslinked either above its melting point or in solution.

| Example No. | | N.M.R Results of Uncrosslinked Polymer-Relative Contributions of Unrearranged and Rearranged Structures in Polymer Chains | Melting point (° C.) | |
|---|---|---|---|---|
| | | | Before treatment | After treatment |
| 28 | 5.0 grams of Example 2 polymer of 1-cyclopropyl-1-phenyl ethylene were admixed with 0.1 gram of AlBr$_3$ for 1.0 hour. | Cyclopropyl 15%, C=C unsaturation 50%, cyclobutyl 35%. | 72-80 | 300 |
| 29 | Same as Example 28 except that polymer heated with 0.5 gram of sulphur at 120° C. for 0.25 hour. | ...do... | 72-80 | 300 |
| 30 | 10 grams of Example 4 polymer of 1-cyclopropyl-1-phenyl ethylene were heated with 0.1 gram of sulfur at a temperature of 120° C. for 0.25 hour. In addition 10 grams of the Example 4 polymer were dissolved in 50 cc. of methylene chloride containing 0.1 gram of AlBr$_3$ and the solution was added to methanol to precipitate and recover the polymer. | ...do... | 78-82 | 300 |
| 31 | 10 grams of Example 13 polymer of 1-cyclopropyl-1-(paratolyl) ethylene were treated in the same manner as disclosed in Example 30. | Cyclopropyl 5%, C=C unsaturation 45%, cyclobutyl 50%. | 105-115 | 188-200 |
| 32 | 10 grams of Example 12 polymer of 1-cyclopropyl-1-(para-fluoro-phenyl) ethylene were treated in the same manner as disclosed in Example 30. | Cyclopropyl C=C unsaturation 50%, cyclobutyl 30%. | 105-115 | 150-158 |
| 33 | 10 grams of Example 20 polymer of 1-cyclopropyl-1-(para-isopropyl phenyl) ethylene were treated in the same manner as disclosed in Example 30. | Cyclopropyl 0%, C=C unsaturation 0%, cyclobutyl 100%. | 94-105 | 132-143 |
| 34 | 10 grams of Example 8 polymer of 1-cyclopropyl-1-(4-methoxy phenyl) ethylene were treated in the same manner as disclosed in Example 30. | Cyclopropyl 5%, C=C unsaturation 45%, cyclobutyl 50%. | 68-76 | 103-108 |
| 35 | 10 grams of Example 22 polymer of 1-cyclopropyl-1-(2,4-dimethyl phenyl) ethylene were treated in the same manner as disclosed in Example 30. | Cyclopropyl 0%, C=C unsaturation 70%, cyclobutyl 30%. | | |
| 36 | 10 grams of Example 24 copolymer of 1-cyclopropyl-1-phenyl ethylene/styrene were treated in the same manner as disclosed in Example 30. | | 75 | 300 |

What is claimed is:

1. A solid thermoplastic polymer composition consisting essentially of recurring structural units of the formulae

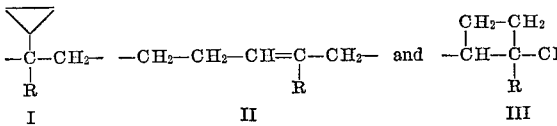

wherein R is a member of the group consisting of phenyl and substituted phenyl, the mole percent of III is at least 30% and the combined mole percent of II and III is 80–100%.

2. The polymer composition of claim 1 wherein R is paraflurophenyl and the mole ratio of

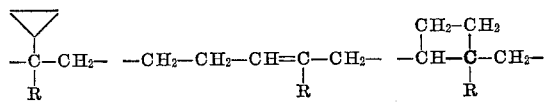

is 20:50:30 respectively.

3. The polymer composition of claim 1 wherein R is p-isopropylphenyl and the mole ratio of

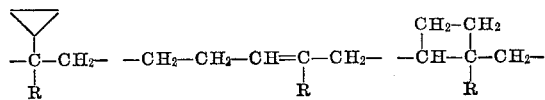

is 0:0:100 respectively.

4. The polymer composition of claim 1 wherein R is 2,4-dimenthylphenyl and the mole ratio of

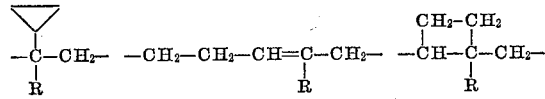

is 0:70:30 respectively.

5. A crosslinkable composition consisting essentially of the polymer composition of claim 1 and 0.1 to 5% by weight of said polymer composition of a crosslinking agent selected from the group consisting of Friedel-Crafts catalyst, sulfur, di and polymercaptans.

6. A solid thermoplastic copolymer composition from 1-cyclopropyl-1-R substituted ethylene monomer of the formula

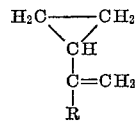

and an olefin monomer of the group consisting of styrene, beta-methyl styrene, alpha-methyl styrene, vinyl ethers, and isobutene consisting essentially of recurring structural units of the monomeric group member and recurring structural units of the formulae

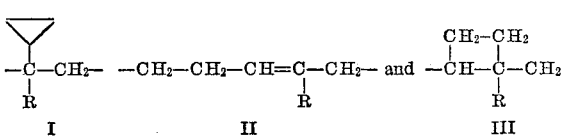

wherein in all formulas herein R is a member of the group consisting of phenyl and substituted phenyl, said portion of the copolymer derived from said ethylene monomer consisting of at least 30 mole percent of III and 80–100 combined mole percent of II and III.

7. A crosslinkable composition consisting essentially of the copolymer composition of claim 6 and 0.1 to 5% by weight of said copolymer composition of a crosslinking agent selected from the group consisting of Friedel-Crafts catalyst, sulfur, di and polymercaptans.

8. The process of polymerizing 1-cyclopropyl-1-R substituted ethylene monomer of the formula

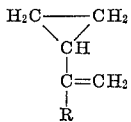

which comprises subjecting said monomer dissolved in an inert liquid hydrocarbon solvent to the action of from about 0.01–10% by weight of the monomer of a Friedel-Crafts catalyst under substantially anhydrous conditions at a temperture in the range of 0 to −130° C. and recovering a solid thermoplastic polymer composition consisting essentially of recurring structural units of the formulae

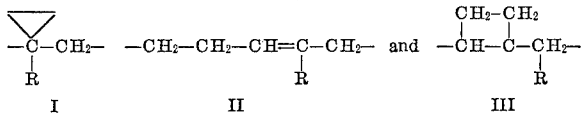

wherein all the formulae herein R is a member of the group consisting of phenyl and substituted phenyl, the mole percent of II being at least 30% and the combined mole percent of II and III being 80–100%.

9. The process of copolymerizing 1-cycloproply-1-R substituted ethylene monomer of the formula

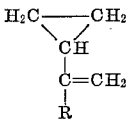

and an olefinic monomer of the group consisting of styrene, beta-methyl styrene, alpha-methyl styrene, vinyl ethers and isobutene which comprises subjecting said ethylene monomer and said olefinic monomer group member dissolved in an inert liquid hydrocarbon solvent to the action of from about 0.01–10% by weight of said monomers of a Friedel-Crafts catalyst under substantially anhydrous conditions at a temperature in the range of 0 to −130° C. and recovering a solid thermoplastic copolymer composition consisting essentially of recurring structural units of the olefin monomer and recurring structural units of the formulae

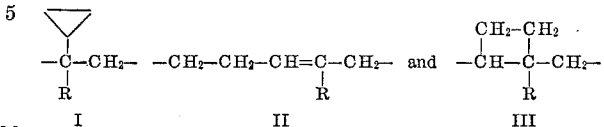

wherein all formulae herein R is a member of the group consisting of phenyl and substituted phenyl, said portion of the copolymer derived from said ethylene monomer consisting of at least 30 mole percent of III and 80–100 combined mole percent of II and III.

10. The polymer composition of claim 8 crosslinked with 0.1 to 5% by weight of said polymer composition of a crosslinking agent selected from the group consisting of sulfur, dimercaptans, polymercaptans, and Friedel-Crafts catalyst.

11. The copolymer composition of claim 9 crosslinked with 0.1 to 5% by weight of said copolymer composition of a crosslinking agent selected from the group consisting of sulfur, dimercaptans, polymercaptans, and Friedel-Crafts catalyst.

References Cited
UNITED STATES PATENTS

| | | | |
|---|---|---|---|
| 3,252,956 | 5/1966 | Natta et al. | 260—93.1 |
| 3,294,771 | 12/1966 | Ketley et al. | 260—93.1 |
| 3,297,672 | 1/1967 | Ketley et al. | 260—93.1 |
| 3,366,616 | 1/1968 | Tietz | 260—93.1 |
| 3,383,371 | 5/1968 | Natta et al. | 260—79.5 |

JOSEPH L. SCHOFER, Primary Examiner

J. C. HAIGHT, Assistant Examiner

U.S. Cl. X.R.

260—80.78, 88.1, 88.2, 93.1, 93.5